Patented June 4, 1935

2,003,458

UNITED STATES PATENT OFFICE 2,003,458

METHOD OF DEHYDRATING PINE OIL

Sereno G. Norton, Brunswick, Ga., assignor to Hercules Powder Company, Wilmington, Del., a corporation of Delaware No Drawing. Application June 19, 1931, Serial No. 545,499

13 Claims. (Cl. 260—167)

This invention relates to method for effecting the dehydration of pine oil, that is to say, more particularly for effecting the dehydration of tertiary alcohols contained in pine oil.

Pine oil, as is well known, is produced from pine wood and more particularly from southern yellow pine wood, by distillation. Pine oil, as is well known, comprises various components including hydrocarbons, oxygenated bodies, such as borneol, anethol, methyl chavicol, etc., secondary alcohols, as fenchyl alcohol, etc., but is composed largely of tertiary alcohols of which terpineols, as alpha-terpineol are in dominating proportion.

Pine oil as such has been recognized as of limited use in the commercial arts due to the large content of tertiary alcohols as compared with, for example, turpentine. Further, while the oxygenated bodies contained in pine oil are of value, their recovery or separation from pine oil is difficult because of their solubility in the tertiary alcohols. On the other hand, it has been recognized that if the tertiary alcohols be dehydrated, that is, converted into hydrocarbons and water, a product comparable for use in the commercial arts with turpentine and usable as a substitute therefor may be obtained, or where recovery or separation of, for example, the oxygenated bodies is desired, such may be readily effected after dehydration of the pine oil.

Heretofore, various methods have been suggested for effecting the dehydration of pine oil in connection, for example, with the production of turpentine substitute, the recovery or separation of oxygenated bodies, etc. Among the methods heretofore suggested, it has been proposed to effect the dehydration of pine oil by heating in the presence of, for example, fuller's earth, other argillaceous earths, activated carbon and iodin, as disclosed, for example, in the Patent No. 1,772,895, dated August 12, 1930, to Irvin W. Humphrey, and by the use of hydriodic acid, as disclosed in the Patent No. 1,772,546, dated August 12, 1930, to Irvin W. Humphrey, etc.

The methods heretofore suggested for effecting the dehydration of pine oil are open to various disadvantages in, for example, that in order to effect the dehydration at temperatures at which excessive polymerization of the hydrocarbons may be avoided the dehydration is by no means complete. Thus, for example, where the dehydration is effected by heating in the presence of fuller's earth only about 60% of the tertiary alcohols are dehydrated using a temperature of 150° C. and a comparatively large amount of polymerization takes place, about 15% of polymerized hydrocarbons being produced.

Now, it is the object of this invention to provide a method for the dehydration of pine oil, that is for effecting the conversion of tertiary alcohols contained in pine oil into hydrocarbons and water ($C_{10}H_{17}OH \rightarrow C_{10}H_{16}+H_2O$), by which the procedure may be carried out at a lower temperature than heretofore, with increase in the percentage of tertiary alcohols dehydrated and decrease in the amount of polymerized products produced.

In accordance with the method embodying this invention, pine oil is subjected to heating in the presence of silica gel. Desirably, the treatment is effected in the presence of, in addition to silica gel, an organic dibasic acid or anhydride, as for example, phthalic anhydride, phthalic acid, tartaric acid, oxalic acid, etc., etc.

In carrying out the method, silica gel, or silica gel and an organic dibasic acid, are added to pine oil and the pine oil heated, the hydrocarbons being distilled off as formed.

In proceeding silica gel, or the natural clay comprising an impure form of silica gel, may be used in any desired amount, but for economy will desirably be used in amount within about the range 0.1%–2% of the pine oil to be dehydrated. The silica gel may be recovered and re-used without any treatment.

As has been indicated, the organic dibasic acid or anhydride may be phthalic anhydride, phthalic acid, tartaric acid, oxalic acid, etc., it being understood that either the acid or the anhydride may be used equivalently. The acid or anhydride may be used in any desired amount, but for economy and due to the fact that it will react with secondary alcohols present in the pine oil and cannot be recovered except by chemical means, it will desirably be used in relatively small amount, say 0.1% to 1% of the pine oil.

In carrying out the treatment, the pine oil will be heated in the presence of silica gel, or of silica gel and organic dibasic acid, at any suitable temperature at which the desired dehydration will be effected and below that at which undesirable polymerization will take place. The treatment may be carried out, for example, at a temperature within say about the range about 90° C. to about 135° C., or within the broader range about 90° C. to about 150° C.

As illustrative of the carrying out of the method embodying this invention, for example, to a quantity of pine oil there is added about 1% of silica gel and the pine oil heated to about 150° C. for a period of 3 hours. About 85% dehydration of the tertiary alcohols in the pine oil will be effected with the formation of only about 7% polymerized products. In the illustration given if 1% of oxalic acid be added to the pine oil in addition to the silica gel, complete dehydration of the tertiary alcohols will be obtained with the formation of only about 13% polymerized products, and even with the use of a temperature somewhat below 100° C. After dehydration is effected the hydrocarbons formed may be distilled off, say using, for example, a temperature of 125° C. under a pressure of 100 mm. mercury, or, if desired, the procedure for effecting dehydration may be carried out under reduced pressure, say 10 mm. mercury, at which the hydrocarbons will distill off at the temperature of 100° C. used.

As a further illustration, for example, to a quantity of pine oil there is added 1% silica gel and 0.1% phthalic anhydride. The pine oil is then heated to 100° C. under reduced pressure, say a pressure of about 10 mm. mercury, to permit distillation off of the hydrocarbons as formed.

In carrying out the method in accordance with this invention, the distillate will be found to comprise largely dipentene and to have valuable properties as a turpentine substitute, solvent and for other uses in the commercial arts. The residue will be found to comprise largely a mixture of secondary alcohols, oxygenated bodies, ketones, ethers, a small amount of polymerized products and the corresponding ester of borneol or of fenchyl alcohol equivalent to the acid or anhydride added. The residue will be found to be adapted for various uses, such, for example, as a disinfectant, or it may be treated for separation of its constituents, such as secondary alcohols, oxygenated bodies, etc.

It will now be noted that the method in accordance with this invention enables the substantially complete or complete dehydration of pine oil with a minimum of polymerization and with the use of temperatures lower than heretofore. As has been indicated, the silica gel used may be recovered and reused without the necessity for any treatment for effecting its regeneration, thus effecting a saving. The acid or anhydride used will not be recoverable, since it will combine with a small percentage of the secondary alcohol present in the pine oil for the formation of the corresponding ester.

What I claim and desire to protect by Letters Patent is:

1. The method of dehydrating pine oil which includes heating pine oil in the presence of silica gel and an organic dibasic acid.

2. The method of dehydrating pine oil which includes heating pine oil in the presence of about 1.0% of silica gel and 0.1% to 1.0% of an organic dibasic acid.

3. The method of dehydrating pine oil which includes heating pine oil to a temperature within the range about 90° C. to about 135° C. in the presence of silica gel and an organic dibasic acid.

4. The method of dehydrating pine oil which includes heating pine oil in the presence of silica gel and an organic dibasic acid to a temperature and under a pressure such that hydrocarbons will be distilled off as formed.

5. The method of dehydrating pine oil which includes heating pine oil in the presence of silica gel and phthalic anhydride at a temperature not substantially in excess of 150° C.

6. The method of dehydrating pine oil which includes heating pine oil in the presence of silica gel and tartaric acid.

7. The method of dehydrating pine oil which includes heating pine oil in the presence of silica gel and oxalic acid.

8. The method of dehydrating pine oil which includes heating pine oil in the presence of silica gel and an organic dibasic acid at a temperature within the range about 100° C. to about 150° C.

9. The method of dehydrating pine oil which includes heating pine oil in the presence of silica gel and phthalic anhydride.

10. The method of dehydrating pine oil which includes heating pine oil in the presence of silica gel and tartaric acid at a temperature not substantially in excess of 150° C.

11. The method of dehydrating pine oil which includes heating pine oil in the presence of silica gel and oxalic acid at a temperature not substantially in excess of 150° C.

12. The method of dehydrating pine oil which includes heating pine oil in the presence of 0.1%–2% of silica gel and an organic dibasic acid.

13. The method of dehydrating pine oil which includes heating pine oil in the presence of 0.1%–2% of silica gel and 0.1%–1.0% of an organic dibasic acid.

SERENO G. NORTON.